Dec. 29, 1959   W. C. EDDY, JR   2,918,999
OVERLOAD CONTROL
Filed June 19, 1957   2 Sheets-Sheet 1

INVENTOR.
WILLIAM C. EDDY, JR.
BY M. A. Hobbs
ATTORNEY

Dec. 29, 1959     W. C. EDDY, JR     2,918,999
OVERLOAD CONTROL

Filed June 19, 1957     2 Sheets-Sheet 2

INVENTOR.
WILLIAM C. EDDY, JR.
BY M. A. Hobbs
ATTORNEY

United States Patent Office 2,918,999
Patented Dec. 29, 1959

2,918,999

OVERLOAD CONTROL

William C. Eddy, Jr., Michigan City, Ind., assignor to Television Associates, Inc., Michigan City, Ind., a corporation of Illinois Application June 19, 1957, Serial No. 666,633

11 Claims. (Cl. 192—.02)

The present invention relates to a load responsive mechanism for controlling the operation of machine tools such as, for example, the drill presses, tapping machines, lathes and other machining equipment utilizing torque as a cutting or feeding force.

The primary object of the present invention is to provide an overload responsive device which can readily be installed on standard and conventional drill presses, tapping machines, lathes and the like, for automatically interrupting the drilling or machining operation and withdrawing the cutting tool when overload conditions are encountered and thereafter returning the cutting tool to operating position.

Another object of the present invention is to provide a device of the aforesaid type which responds immediately to overload conditions in machining equipment to interrupt the operation and relieve the torque force on the cutting tool or feeding device.

Still another object of the invention is to provide an overload responsive mechanism for machine tool equipment employing a torque force for either the machining or feeding operation, which can readily be adjusted to predetermined maximum loads and which will permit the machine to operate in the same manner as if the mechanism were not installed except when load conditions approach the point where damage to the machine or cutting tool might occur.

Further objects and advantages will become apparent from the following description and accompanying drawings, wherein.

Figures 1, 5:
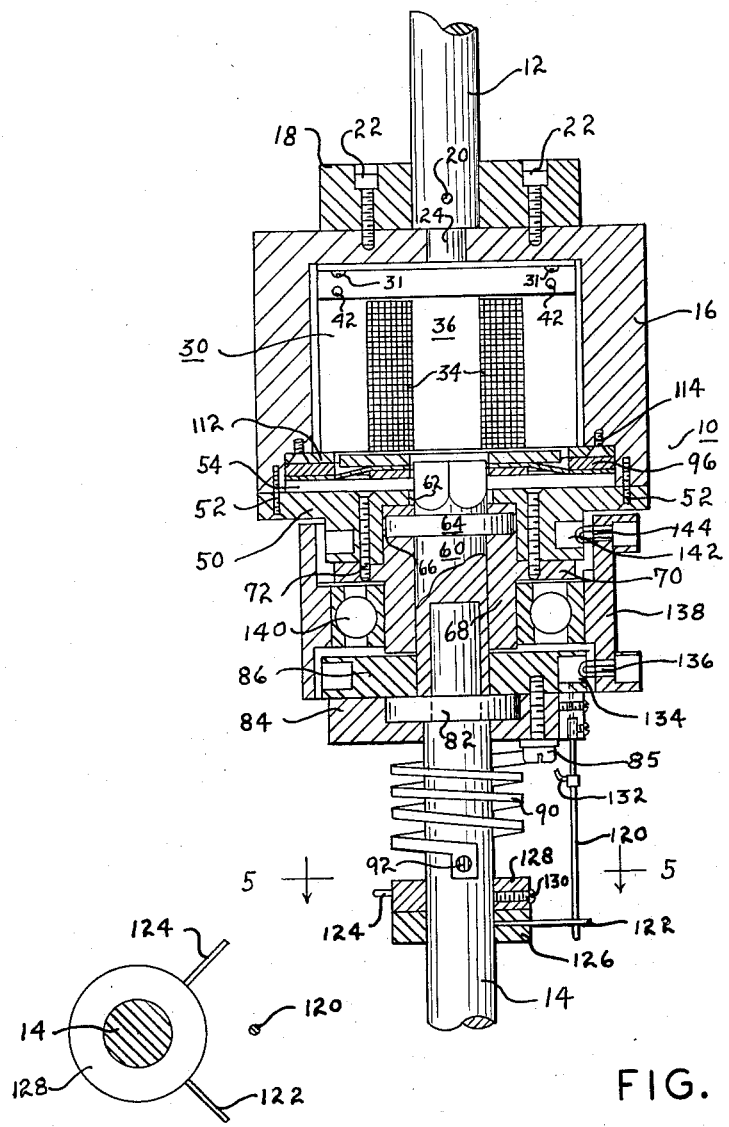
Figure 1 is a vertical cross sectional view of my load responsive mechanism.
Figure 5 is a cross sectional view of my mechanism taken on line 5—5 of Figure 1.

The present overload responsive mechanism is designed for adaptability to a variety of operations and a number of different types of machines which employ a torque force for either the cutting tool or feeding mechanism and can be used with machines wherein the tool is moved and the work piece is held stationary or machines wherein the tool is held stationary and the work piece is moved. For convenience of description of the present invention, specific reference to its use will be to drill presses and tapping machines since it is especially adapted to drilling and tapping operations. The equipment will be considered as conventional automatic machines having a pneumatic or hydraulic feed with electrically actuated control valves. In this type of machine the operator merely operates the control switch to start the automatic feeding of the drill or die after it has been located correctly relative to the work. When the operator closes the control switch, a solenoid valve is operated to admit air or hydraulic fluid into a cylinder for quickly feeding the head into cutting position, and the drilling or tapping is accomplished in one or more strokes. At the end of the final step, the head is quickly withdrawn from the work to its initial starting position. The foregoing steps are set and controlled by a preselected cycle and are performed without regard to the condition of the drill or machining characteristics of the metal in each work piece.

The present overload responsive device, generally designated by numeral 10, has two axial protruding shafts 12 and 14, the former being adapted to be inserted in or connected to the spindle of the drill press, tapping machine or the like, or elsewhere in the power transfer shafting, and the latter shaft being adapted to receive a chuck, die, or other cutting tool adapter. Shaft 12 may be provided with a Morse taper for mounting in conventional drill presses or tapping machines, and is secured rigidly to the main housing 16 of the mechanism by a collar 18 around the lower end of the shaft and joined firmly thereto by a pin 20 extending through the collar and the shaft. The collar in turn is held firmly to the upper side of the housing and in axial alignment therewith by a plurality of screws 22 extending through the collar into the housing. To give further stability to the shaft and to assist in assembling the shaft and collar on the housing, a reduced diameter portion 24 in axial alignment with the principal portion of the shaft is provided for seating in an axial hole in the upper side of the housing. Housing 16 is cylindrical in shape and assumes the position of an inverted cup in the mechanism and contains an electromagnet 30 secured to the inner end of the cup-shaped housing by a plurality of screws 31. Magnet 30 forms the magnetic portion of a magnetic clutch. The magnet may be considered, for the purpose of the present description, a conventional portative or holding electromagnet consisting of a coil 34 mounted on an E core 36 of laminated iron. The layers of metal forming the core are secured together by a plurality of rivets 42 extending laterally through the core near the upper end thereof. Magnet 30, housing 16, collar 18 and shaft 12 all rotate in unison when the mechanism is mounted in a drill press.

The lower end of the cup-shaped housing is closed by a disc-shaped partition member 50 secured to the lower edges of the outside wall of the housing by a plurality of screws 52 forming an enclosed cylindrical compartment 54 in the housing. A shaft 60 extends through a bushing 62 in member 50 into chamber 54 and is held against axial movement by a collar 64 secured to the shaft and seated in a cylindrical recess 66 formed in the underside of member 50. Collar 64 is retained in recess 66 by a sleeve 68 provided with a flange 70 having threaded holes therein for receiving a plurality of screws 72 which hold flange 70 against the lower side of partition member 50 and the upper end of sleeve 68 against the underside of collar 64.

The lower end of shaft 60 has an axial hole for receiving the upper end of shaft 14 which is held against axial movement, but not against rotative movement relative to shaft 60, by a collar 82 secured to shaft 14 and held firmly against the lower end of shaft 60 by a collar 84 mounted on shaft 14 and secured by a plurality of screws 85 to a disc-shaped member 86 which in turn is rigidly secured by set screws or the like (not shown) to the lower outside portion of shaft 60. It is seen from the foregoing description that shaft 60, collars 82 and 84 and member 86 form an integral unit which is adapted to rotate in unison relative to housing 16, member 50 and sleeve 68, which latter elements also form an integral unit and rotate in unison. Shaft 14 is limited in the amount of rotation relative to shaft 60, collar 84 and member 86 by a relatively strong calibrated spring 90 disposed around shaft 14 and connected at its upper end to collar 84 by one of screws 85 and at its lower end to the side of shaft 14 by a screw 92. Spring 90 permits shaft 14 to rotate a partial revolution relative to collar 84 and it is this partial revolution against the force of spring 90 which is employed to determine when overloading of the drill press, tapping machine, or other machine tool has been reached. The spring assumes a dead center position and when shaft 14 is rotated in either direction relative to collar 84 it must overcome increasing force of the spring.

Figures 2, 3, 4:
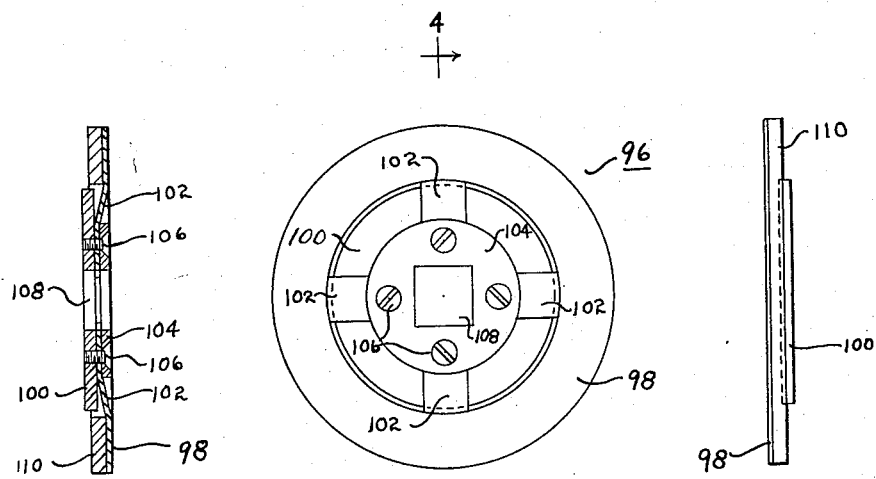
Figure 2 is a plan view of a clutch plate employed in my mechanism.
Figure 3 is a side view of the clutch plate shown in Figure 2.
Figure 4 is a cross sectional view of the clutch plate shown in Figures 2 and 3, taken on line 4—4.

A clutch plate 96 forms the connecting link between shaft 60 and magnet 30 and, as shown in Figures 2, 3 and 4, consists of a flat metal ring 98 connected to a disc-shaped pole piece 100 by four arms 102 integrally joined to the inner edge of ring 98 and clamped between a retaining disc 104 and one side of pole piece 100 by screws 106. A square axial hole 108 is provided in pole piece 100 and disc 104 for receiving the upper rectangular end of shaft 60 so that the clutch plate will rotate in unison with said shaft. To the side of ring 98 facing the magnet is secured a ring shaped plate 110 of friction material which seats on the opposed face of a metal ring 112 rigidly secured to housing 16 around the magnet by a plurality of screws 114. Clutch plate 96 is adapted to move freely axially on shaft 60 to and from the magnet as the latter is energized and deenergized, and when the magnet is energized the pole piece is drawn against the lower end of core 36 completing the magnetic circuit. When friction plate 110 initially contacts ring 112, pole piece 100 is spaced from the lower end of the core and posts; however, arms 102 are sufficiently resilient to permit the pole piece to move upwardly relative to plate 110 and seat on the end of the core and posts. This construction assures firm seating of the friction plate 110 on ring 112 during normal operation of my overload control mechanism while the magnet is energized, and permits the clutch to compensate for the wear of plate 110 occurring during the life of the mechanism. When the clutch plate is being held in its clutched position by the magnet my entire mechanism, including shafts 12 and 14, rotates in unison transferring the full torque force of shaft 12 to shaft 14, and when the plate is declutched shaft 12 is free to rotate independently of shaft 14.

The mechanism which senses the overload condition includes an electrical contact element 120 rigidly secured to but insulated from collar 84 and electrical contact elements 122 and 124 seated in collars 126 and 128, respectively, said collars being mounted on shaft 14 below spring 90 and adjustably secured to the shaft by set screws such as the one shown at numeral 130 of collar 128. Elements 122 and 124 form grounds for the control circuit of my mechanism. Contact element 120 is connected by a lead 132 to a slip ring 134 mounted on the periphery of member 86 and a contact brush 136 for the slip ring is carried by a free rotating ring 138. Since the leads from the control box and the power supply for the magnet enter the mechanism by way of ring 134 this ring remains stationary while the remainder of the mechanism rotates. The ring is preferably mounted on ball bearings such as shown at numeral 140 to facilitate the free relative rotations between the ring and the rest of the mechanism. Another slip ring 142 is mounted on an annular surface of partition member 50 and together with a contact brush 144 mounted in ring 138 forms a connection for the power supply of the magnet, a lead (not shown in Figure 1) connecting slip ring 142 with the magnet.

Figure 6:
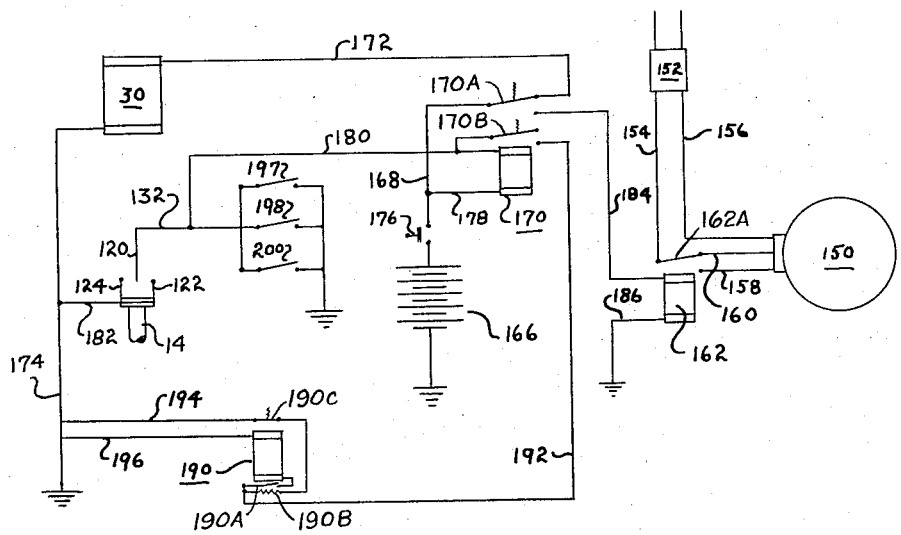
Figure 6 is an electrical diagram of the circuitry for operating and controlling my mechanism.

The circuitry for my overload mechanism is shown diagrammatically in Figure 6, wherein numeral 150 designates an electrical motor for a tapping machine, drill press or the like, and numeral 152 a switch for the motor in the main power supply lines 154 and 156, the motor being driven in the forward and reverse directions by current supplied through leads 158 and 160, respectively. A latching relay 162 with switch element 162A switches the current alternately between leads 158 and 160 in response to a signal from the control circuitry. Electrical magnet 30 is connected to a source of power, shown in Figure 6 as a battery 166, by lead 168, relay 170 and lead 172 and is grounded through lead 174. The magnet is initially energized when main switch 176 in lead 168 is manually closed by the machine operator.

In the event an overload condition develops in the equipment such that shaft 14 rotates relative to shaft 12 in opposition to spring 90 until contact element 120 engages contact element 122, relay 170 is energized through a circuit consisting of leads 168 and 178 connecting the relay with battery 166 and leads 180 and 132, contacts 120 and 122 and leads 182 and 174. When the relay 170 is actuated, switch element 170A shifts from lead 172 to lead 184, and switch element 170B connects lead 180 with lead 192, thus operating latching relay 162 through leads 184 and 186 to reverse motor 150 and operating a time delay relay 190 through leads 192, 194 and 196 to delay the reenergization of magnet 30 until the motor has had sufficient time to reverse the rotation of shaft 12 and housing 16. The time delay mechanism of relay 190 is conventional, consisting of a thermostatic switch 190A and resistance wire 190B for heating the thermostatic switch to close the circuit to the solenoid of said relay, and thereby open switch element 190C. When the time delay relay opens switch 190C, and the circuit consisting of leads 192 and 194, relay 170 is deenergized, again closing the circuit to the magnet. The motor continues to operate in reverse until relay 170 is again actuated, either by the closing of a contact 124 or one of the limit switches 197, 198 and 200. Contact elements 120 and 124 are held in spaced position by spring 90 until an overload condition develops while the motor is operating in reverse. When this condition occurs the force of spring 90 is overcome and shaft 14 rotates relative to shaft 12 causing contact 120 to engage contact 124 thus closing the circuit to relay 170 and again operating latching relay 162 to reverse the rotation of the motor to its forward direction. The limit switches 197, 198 and 200 are closed by predetermined conditions occurring in the operation of the machine, such as the desired maximum travel of the spindle in one or the other directions. When any one of these three switches is closed the same sequence of operation of relay 170, time delay relay 190 and latching relay takes place as explained above when elements 120 and 122 are closed.

Contacts 122 and 124 can be adjusted relative to contact 120 by merely rotating the respective collars on shaft 14. This permits the mechanism to be adjusted to various overload conditions for both forward and reverse directions of motor 150. If desired, contacts 120, 122 and 124 can be built as a compact switch housed completely in the overload control unit, and contact 124 can be eliminated and a switch used in its place for shutting off the machine when the cutting tool has been completely withdrawn from the work piece.

In the operation of the foregoing mechanism installed on a tapping machine, the machine is started by closing switch 152 to operate motor 150 while the magnet is deenergized. At this time shaft 12, housing 16, partition member 50, sleeve 68 and magnet 30 all rotate in unison, while shaft 60, clutch plate 96, member 86, collar 84 and shaft 14 all remain stationary. The operator then closes switch 176 completing the circuit to magnet 30 which seats the clutch firmly against ring 112 and causes shafts 14 and 60 and the other members secured thereto to operate in unison with the housing and shaft 12. The tapping machine thus operates in the same manner as if the overload mechanism were not installed thereon. In the event the cutting tool becomes choked or otherwise binds in the work piece, the torque on shaft 14 immediately increases. If the torque reaches the torque limit as determined by the strength of spring 90 the mechanism rotates relative to shaft 14 in opposition to spring 90 until contact element 120 engages contact 122. This immediately declutches the unit so that no additional force is applied to shaft 14 even though shaft 12 and housing 16 may continue to rotate. At the same time that the unit is declutched the main motor is reversed for withdrawing the cutting tool from the work piece; however, the control circuitry delays the reenergization of the magnet until the motor has had time to stop and start in the reverse direction. If, after the motor has been reversed and the clutch reengaged, the cutting tool can not free itself from the work piece, the torque on shaft 14 increases, rotating the overload mechanism relative to shaft 14 sufficiently to engage contact element 120 and element 124. When this occurs the mechanism becomes declutched again. The forward and reversing operation will continue until the machine is shut down or the condition causing the choking of the cutting tool has been eliminated.

Various changes in my overload responsive mechanism including the circuitry, in addition to those mentioned previously herein, may be made without departing from the scope of the present invention.

I claim:

1. An overload responsive mechanism, comprising a rotatable torque input shaft, a hollow cylindrical housing mounted on the end of said shaft and in axial alignment therewith, an electromagnet in said housing, an annular member disposed in and rotatable with said housing, a shaft in axial alignment with said first mentioned shaft and adapted for relative rotation therewith, a torque output shaft in axial alignment with said shafts and adapted for relative rotation therewith, a means having a calibrated spring forming a resilient connection between said second and third mentioned shafts, a clutch plate rotatable with said second mentioned shaft for engaging said member when said magnet is energized, an electrical circuit for said magnet, an electrical circuit for controlling said first mentioned circuit including two adjustable spaced contacts movable with said third mentioned shaft, and a contact movable with said second mentioned shaft and extending between said first two mentioned contacts for engagement therewith.

2. An overload responsive mechanism, comprising a rotatable torque input shaft, a hollow cylindrical housing secured to the end of said shaft and in axial alignment therewith, means including an electromagnet in said housing, a shaft in axial alignment with said first mentioned shaft and adapted for relative rotation therewith, a torque output shaft in axial alignment with said shafts and adapted for relative rotation therewith, a resilient means forming a connection between said second and third mentioned shafts, a clutch plate rotatable with said second mentioned shaft for engaging said first mentioned means, an electrical circuit for said magnet, an electrical circuit for controlling said first mentioned circuit including two spaced contacts movable with said third mentioned shaft, and a contact movable with said second mentioned shaft and extending between said first two mentioned contacts for engagement therewith.

3. An overload responsive mechanism, comprising a rotatable torque input shaft, an electromagnetic means joined to said shaft, a shaft in axial alignment with said first mentioned shaft and adapted for relative rotation therewith, a torque output shaft in axial alignment with said shafts and adapted for relative rotation therewith, a resilient means forming a connection between said second and third mentioned shafts, a clutch means rotatable with said second mentioned shaft for engaging said magnetic means, an electrical circuit for said magnet, an electrical circuit for controlling said first mentioned circuit including a contact movable with said third mentioned shaft, and a contact movable with said second mentioned shaft and extending between said first two mentioned contacts for engagement therewith.

4. An overload responsive mechanism, comprising a rotatable torque input shaft, a hollow cylindrical housing mounted on the end of said shaft and in axial alignment therewith, an electromagnet in said housing, an annular member disposed in and rotatable with said housing, a shaft in axial alignment with said first mentioned shaft and adapted for relative rotation therewith, a torque output shaft in axial alignment with said shafts, said second and third mentioned shafts being mounted in said mechanism for rotative movement only and for relative rotation with each other, a means having a calibrated spring forming a resilient connection between said second and third mentioned shafts, a means responsive to the relative rotation of said second and third shafts for energizing said magnet, and a clutch plate rotatable with said second mentioned shaft for engaging said member when said magnet is energized.

5. An overload responsive mechanism, comprising a rotatable torque input shaft, a hollow cylindrical housing secured to the end of said shaft and in axial alignment therewith, means including an electromagnetic means mounted in said housing for rotation therewith, a shaft in axial alignment with said first mentioned shaft and adapted for relative rotation therewith, a torque output shaft in axial alignment with said shafts, said second and third mentioned shafts being mounted in said mechanism for rotative movement only and for relative rotation with each other, a resilient means forming a connection between said second and third mentioned shafts, a means responsive to the relative rotation of said second and third shafts for energizing said magnet, and a clutch plate rotatable with said second mentioned shaft for engaging said first mentioned means.

6. An overload responsive mechanism, comprising a rotatable torque input shaft, an electromagnetic means joined to said shaft, a shaft in axial alignment with said first mentioned shaft and adapted for relative rotation therewith, a torque output shaft in axial alignment with said shafts, said second and third mentioned shafts being mounted in said mechanism for rotative movement only and for relative rotation with each other, a resilient means forming a connection between said second and third mentioned shafts, a means responsive to the relative rotation of said second and third shafts for energizing said magnet, and a clutch means rotatable with said second mentioned shaft for engaging said magnetic means.

7. An overload responsive mechanism, comprising a rotatable torque input shaft, a shaft in axial alignment with said first mentioned shaft and adapted for relative rotation therewith, an electromagnetic clutch means connecting said shafts, a torque output shaft in axial alignment with said shafts and adapted for relative rotation therewith, a means having a calibrated spring forming a resilient connection between said second and third mentioned shafts, an electrical circuit for said magnet, an electrical circuit for controlling said first mentioned circuit including two adjustable spaced contacts movable with said third mentioned shaft, and a contact movable with said second mentioned shaft and extending between said first two mentioned contacts for engagement therewith.

8. An overload responsive mechanism, comprising a rotatable torque input shaft, a shaft in axial alignment with said first mentioned shaft and adapted for relative rotation therewith, an electromagnetic clutch means connecting said shafts, a torque output shaft in axial alignment with said shafts and adapted for relative rotation therewith, a resilient means forming a connection between said second and third mentioned shafts, an electrical circuit for said magnetic clutch means, an electrical circuit for controlling said first mentioned circuit, having a contact movable with said third mentioned shaft, and a contact movable with said second mentioned shaft and extending between said first two mentioned contacts for engagement therewith.

9. An overload responsive mechanism, comprising a rotatable torque input shaft, a shaft in axial alignment with said first mentioned shaft and adapted for relative rotation therewith, an electromagnetic clutch means forming an interruptable connection between said shafts, a torque output shaft in axial alignment with said shafts, said second and third mentioned shafts being mounted in said mechanism for rotative movement only and for relative rotation with each other, a resilient means forming a driving connection between said second and third mentioned shafts, and a means responsive to the relative rotation of said second and third shafts for energizing said magnet.

10. An overload responsive mechanism for a machine having a reversible motor, comprising a rotatable torque input shaft, a shaft in axial alignment with said first mentioned shaft and adapted for relative rotation therewith, an electromagnetic clutch means connecting said shafts, a torque output shaft in axial alignment with said shafts and adapted for relative rotation therewith, a resilient means forming a connection between said second and third mentioned shafts, an electrical circuit for said magnetic clutch means, an electrical circuit for the reversible motor, an electrical circuit for controlling said circuits to declutch said clutch means and reverse the operation of said motor including two adjustable spaced contacts movable with said third mentioned shaft, and a contact movable with said second mentioned shaft and extending between said first two mentioned contacts for engagement therewith.

11. An overload responsive mechanism for a machine having a reversible motor, comprising a rotatable torque input shaft, a shaft in axial alignment with said first mentioned shaft and adapted for relative rotation therewith, an electromagnet clutch means connecting said shafts, a torque output shaft in axial alignment with said shafts and adapted for relative rotation therewith, a resilient means forming a connection between said second and third mentioned shafts, an electrical circuit for said magnetic clutch means, an electrical circuit for the reversible motor, an electrical circuit for controlling said circuits to declutch said clutch means and reverse the operation of said motor including a contact movable with said third mentioned shaft, and a contact movable with said second mentioned shaft and extending between said first two mentioned contacts for engagement therewith.

References Cited in the file of this patent

UNITED STATES PATENTS

| | | |
|---|---|---|
| 919,039 | Leoni | Apr. 20, 1909 |
| 2,068,260 | Biggert | Jan. 19, 1937 |
| 2,388,700 | Morrill | Nov. 13, 1945 |
| 2,547,137 | Ochtman | Apr. 3, 1951 |